United States Patent
Burgess et al.

(10) Patent No.: US 10,033,926 B2
(45) Date of Patent: Jul. 24, 2018

(54) DEPTH CAMERA BASED IMAGE STABILIZATION

(71) Applicant: Google Inc., Mountain View, CA (US)

(72) Inventors: Gregory M Burgess, Redmond, WA (US); Thor Carpenter, Kirkland, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/935,092

(22) Filed: Nov. 6, 2015

(65) Prior Publication Data

US 2017/0134656 A1 May 11, 2017

(51) Int. Cl.
| | | |
|---|---|---|
| H04N 5/228 | (2006.01) |
| H04N 5/232 | (2006.01) |
| H04N 5/272 | (2006.01) |
| H04N 5/262 | (2006.01) |
| G06T 7/00 | (2017.01) |

(52) U.S. Cl.
CPC ....... H04N 5/23248 (2013.01); G06T 7/0024 (2013.01); H04N 5/23219 (2013.01); H04N 5/2628 (2013.01); H04N 5/272 (2013.01); G06T 2207/10028 (2013.01)

(58) Field of Classification Search
CPC .......... G06T 7/2006; G06T 7/2033; G06T 2207/20021; G06T 2207/10016; H04N 5/23248; H04N 5/44543; H04N 21/44008; H04N 21/4415; H04N 21/485; H04N 21/4402; G06K 9/00335; G06K 9/00308
See application file for complete search history.

(56) References Cited

U.S. PATENT DOCUMENTS

| | | | |
|---|---|---|---|
| 7,436,437 B2 | 10/2008 | Fletcher et al. | |
| 7,925,053 B2* | 4/2011 | Altherr | G06T 7/2006 348/208.99 |

(Continued)

FOREIGN PATENT DOCUMENTS

| | | |
|---|---|---|
| EP | 2053844 A1 | 4/2009 |
| WO | 2013058735 A1 | 4/2013 |

OTHER PUBLICATIONS

Tao Yue, Jinli Suo, Qionghai Dai, Depth-Aware Motion Deblurring, IEEE Trans. on Image Processing, 2012.

(Continued)

*Primary Examiner* — Twyler Haskins
*Assistant Examiner* — Carramah J Quiett
(74) *Attorney, Agent, or Firm* — Lowenstein Sandler LLP

(57) ABSTRACT

A processing device collects depth data for frames in a sequence of images of a video stream being provided by a source device to a target device as part of a communication session. The depth data is created by a depth aware camera of the source device. The processing device maps, using the depth data, feature locations of the features of an object in a frame to feature locations of the features of the object in other frames, determines overlapping frame sections between the frames using the mapped feature locations, modifies, in the sequence of images, a set of images corresponding to the frames based on the overlapping frame sections to create a stabilized stream of images for the video stream, and provides the stabilized stream of images in the video stream as part of the communication session.

14 Claims, 7 Drawing Sheets

(56) References Cited

U.S. PATENT DOCUMENTS

| | | |
|---|---|---|
| 8,279,291 B2 | 10/2012 | Ooishi |
| 8,488,010 B2 | 7/2013 | Voss et al. |
| 2011/0249190 A1* | 10/2011 | Nguyen ................ H04N 5/272 |
| | | 348/708 |
| 2013/0307937 A1 | 11/2013 | Kim |
| 2016/0249039 A1* | 8/2016 | Tran ........................ G06T 7/593 |

OTHER PUBLICATIONS

Capel, David Peter, Image Mosaicing and Super-resolution, University of Oxford, 2001, pp. 1-263.

Lindner, A., Atanassov, K., & Goma, S. (Mar. 2015). Depth enhanced and content aware video stabilization. In SPIE/IS&T Electronic Imaging (pp. 941106-941106). International Society for Optics and Photonics. 6 pages.

PCT Search Report & Written Opinion, Re: Application # PCT/US2016/060707, dated Feb. 7, 2017. 6 pages.

* cited by examiner

DEPTH CAMERA BASED IMAGE STABILIZATION

TECHNICAL FIELD

Aspects and implementations of the present disclosure relate to image stabilization, and more specifically, to depth camera based image stabilization.

BACKGROUND

Recording videos and sharing them with friends has become an accepted norm in today's world of social communication. Various hand-held devices, such as mobile phones, eye glasses, etc., all come equipped with video cameras that allow the users to record videos and share them with their friends and family. Video cameras can also be used to enable video collaborations over the Internet (e.g., video chats, videoconferences, telemedicine, etc.). Often times, however, the quality of video content recorded by users is non-optimal. For example, video cameras may shake and cause visible frame-to-frame jitter in the video.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device collects depth data for frames in a sequence of images of a video stream being provided by a source device to a target device as part of a communication session between a user of the source device and a user of the target device. The depth data is created by a depth aware camera of the source device. The processing device maps, using the depth data, feature locations of one or more features of an object in a frame in the sequence of images to feature locations of the one or more features of the object in at least one other frame in the sequence of images, determines one or more overlapping frame sections between the frame and the at least one other frame using the mapped feature locations, modifies, in the sequence of images, a set of images corresponding to the frame and the at least another frame based on the overlapping frame sections to create a stabilized stream of images for the video stream, and provides the stabilized stream of images in the video stream as part of the communication session.

In one implementation, the object is at least a portion of a face or a facial feature. Recognition of a user's face or facial features is performed only after receiving explicit authorization from the user. In one implementation, the processing device modifying the set of images includes identifying a person in the images as a foreground object, identifying one or more objects in the set of images, other than the person of the source device, as background objects, and removing one or more sections of the frames that correspond to the set of images containing the background objects.

In one implementation, the processing device is to determine the one or more overlapping frame sections by aligning the frame and the at least one other frame using the mapped feature locations, and identifying, as the overlapping frame sections, one or more sections in a foreground portion of the frame and one or more sections in a foreground portion of the at least one other frame comprising at least one of same objects or same portions of objects.

In one implementation, the overlapping sections include at least a portion of a person, and the processing device is to modify the set of images to create the stabilized stream of images by cropping the overlapping frame section of the frame and the overlapping frame section of the at least one other frame, create a copy of the frame and the at least one other frame, and replace a section of the copy of the frame that contains the portion of the person with the overlapping frame section without modifying a background portion of the frame and a background portion of the at least one other frame. In one implementation, the communication session is a video chat via a mobile device.

An apparatus to provide depth camera based image stabilization is also described. The apparatus includes means for collecting depth data for frames in a sequence of images of a video stream being provided by a source device to a target device as part of a communication session between a user of the source device and a user of the target device. The depth data is created by a depth aware camera of the source device. The apparatus includes means for mapping, using the depth data, feature locations of one or more features of an object in a frame in the sequence of images to feature locations of the one or more features of the object in at least one other frame in the sequence of images, means for determining one or more overlapping frame sections between the frame and the at least one other frame using the mapped feature locations, means for modifying, in the sequence of images, a set of images corresponding to the frame and the at least another frame based on the overlapping frame sections to create a stabilized stream of images for the video stream, and means for providing the stabilized stream of images in the video stream as part of the communication session.

In one implementation, the object is at least a portion of a face or a facial feature. Recognition of a user's face or facial features is performed only after receiving explicit authorization from the user. In one implementation, the means for modifying the set of images includes means for identifying a person in the images as a foreground object, means for identifying one or more objects in the set of images, other than the person of the source device, as background objects, and means for removing one or more sections of the frames that correspond to the set of images containing the background objects.

In one implementation, the means for determining the one or more overlapping frame sections includes means for aligning the frame and the at least one other frame using the mapped feature locations, and means for identifying, as the overlapping frame sections, one or more sections in a foreground portion of the frame and one or more sections in a foreground portion of the at least one other frame comprising at least one of same objects or same portions of objects.

In one implementation, the overlapping sections include at least a portion of a person, and the means for modifying the set of images to create the stabilized stream of images includes means for cropping the overlapping frame section of the frame and the overlapping frame section of the at least one other frame, means for creating a copy of the frame and the at least one other frame, and means for replacing a section of the copy of the frame that contains the portion of the person with the overlapping frame section without modifying a background portion of the frame and a background portion of the at least one other frame.

In additional implementations, computing devices for performing the operations of the above described implementations are also implemented. Additionally, in implementations of the disclosure, a computer readable storage media may store instructions for performing the operations of the implementations described herein.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to depth camera based image stabilization. Cameras that capture a sequence of images for a video can be unstable and can cause visible frame-to-frame jitter in the video. A video frame is one of the many still images which compose a moving picture (hereinafter referred to as "video"). Jitter refers to a result from vibration in an assembly or from, for example, the unstable hand of a user of a source device that is capturing the video.

Accordingly, described herein in various implementations are technologies that enable real-time depth camera based image stabilization. Implementations disclosed can be applied to video communications between users that are conducted, for example, via video messaging applications, audio and/or videoconferences, audio and/or video chats, audio and/or videoconference rooms, audio and/or video chat rooms, etc., in which video communications are transmitted and/or received by devices of one or more users in real-time. A video communication can include, for example, a video communication in a video chat, in a video message, and in a videoconference. The term "real-time" indicates that an operation occurs within a specified time constraint (e.g., under 50 microseconds). For example, a real-time transmission of a video communication from a sender to a receiver occurs within a specified time constraint (e.g., under 50 microseconds) from the recording of content, and/or a real-time receipt of the video communication by the receiver occurs within a specified time constraint (e.g., under 50 microseconds) from the transmission of the video communication.

A sender user may be using a mobile device for a video chat with a recipient user, and the sender user and/or mobile device may be moving during the video chat, which may result in a sequence of images that present shaky video footage to the recipient user. Implementations of the present disclosure collect depth data from a depth aware camera on the source mobile device and use the depth data to create real-time sequence(s) of images that present a stabilized video on the target device of a recipient user. Implementations of the present disclosure use the depth data to remove frame-to-frame jitter in video communications.

Figure 1:
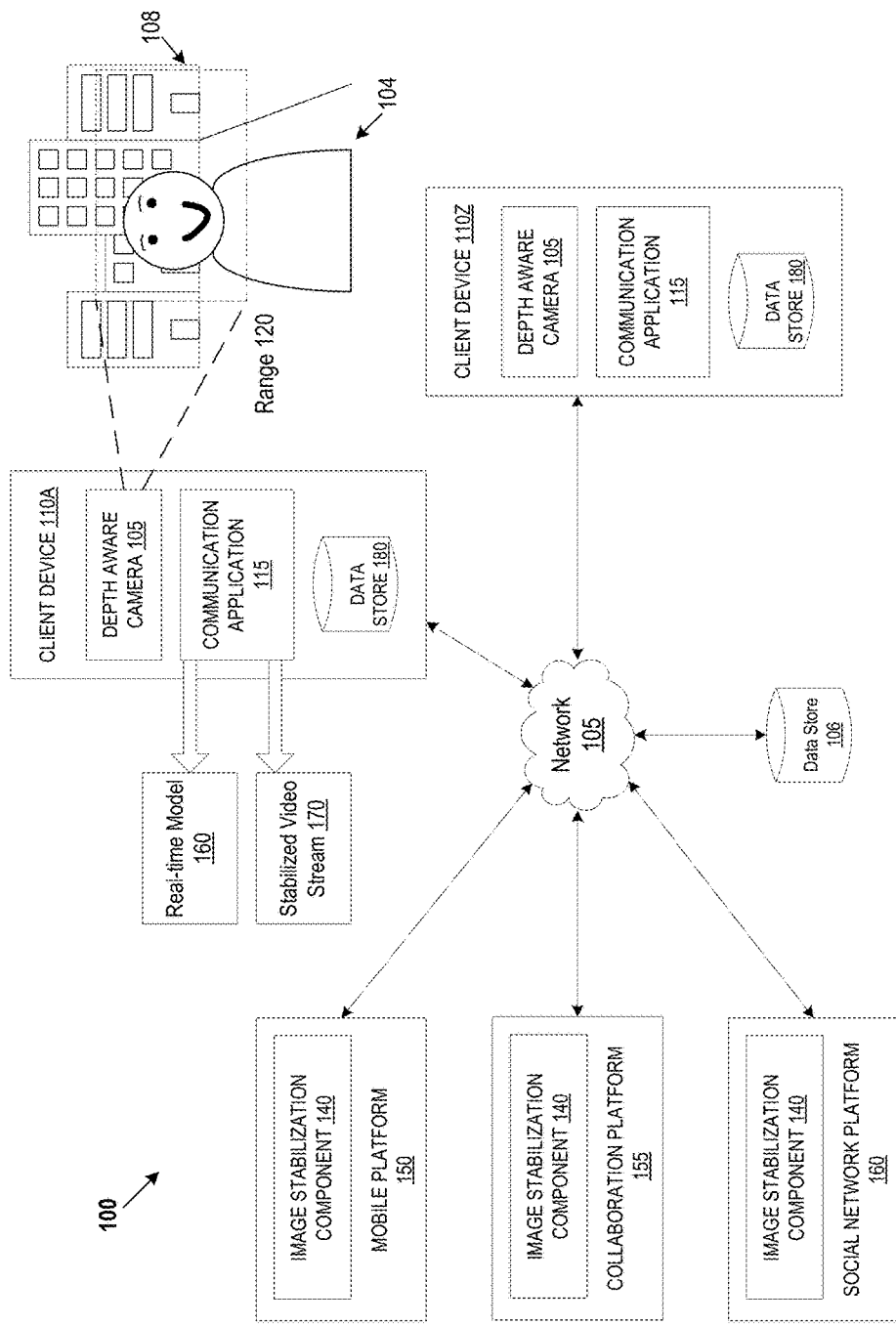
FIG. 1 depicts illustrative system architecture, in accordance with one implementation of the present disclosure.

FIG. 1 illustrates an example of system architecture 100, in accordance with one implementation of the disclosure, for depth camera based image stabilization in video communications in real-time communication sessions. The system architecture 100 includes client devices 110A through 110Z, a network 105, a data store 106, a collaboration platform 155, a social network platform 160, and a mobile platform 150.

In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 can be a persistent storage that is capable of storing data. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

Collaboration platform 155 can enable collaboration services, such as video chat, video messaging, and audio and/or videoconferences (e.g., among the users of devices 110A-110Z) using, for example, streaming video or voice over IP (VoIP) technologies, cellular technologies, LAN and/or WAN technologies, and may be used for personal, entertainment, business, educational or academically oriented interactions. Collaboration platform 155 can provide video conferencing services or may provide video conferencing services along with other services including, for example, news services, social networking services and/or content hosting services. For instance, the collaboration platform 155 may allow a user to view a video clip or a news article and start a videoconference while viewing the video clip or the news article. In another example, the collaboration platform 155 may allow a user to start a videoconference while visiting a social networking site or video content hosting site.

Mobile platform 150 may be and/or include one or more computing devices (e.g., servers), data stores, networks (e.g., phone network, cellular network, local area network, the Internet, and/or a combination of networks), software components, and/or hardware components that may be used to allow users to connect to, share information, and/or interact with each other using one or more mobile devices (e.g., phones, tablet computers, laptop computers, wearable computing devices, etc.) and/or any other suitable device. For example, the mobile platform 150 may enable telephony communication, Short Message Service (SMS) messaging, Multimedia Message Service (MMS) messaging, text chat, and/or any other communication between users. The mobile platform 150 can support user communications via video messaging, video chat, and/or videoconferences.

The social network platform 160 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide communication between users. For example, the social network platform 160 may allow users to communicate via video messaging, video chat, and/or videoconferences.

The client devices 110A through 110Z can be computing devices, such as personal computers (PCs), laptops, mobile phones, smart phones, tablet computers, netbook computers etc. In some implementations, client device 110A through 110Z may also be referred to as "user devices."

Each client device can include a communication application 115. In one implementation, the communication applications 115 may be applications that allow users to compose, send, and receive video communications between the users in real-time over the collaboration platform 155, mobile platform 150, social network platform 160, and/or network 105, and/or a combination of platforms and/or networks. For example, the communication application 115 may be a video messaging application, video chatting application, and/or videoconferencing application, or any combination of such applications. The video communications can be video streams, video/audio streams and/or content streams, video chat messages, video messages, etc. The communication application 115 in a client device can render, display, and/or present one or more video communications in one or more communication sessions to a user. For example, the communication application 115 can provide one or more user interfaces to prompt a user of the client device 110 to initiate and/or participate in a communication session and to send and/or receive video communications (e.g., video conference communications, video messages, video chat messages, etc.).

In one implementation, the communication applications 115 may be applications that allow users to compose, send, and receive video communications between the users in real-time over network 105 using a peer-to-peer connection between client devices. In a peer-to-peer connection, the client devices can communicate to each other independently of a service of a service provider.

One or more of the client devices 110A-110Z can include a depth aware camera 105. A depth aware camera can use a RGB (Red, Green, Blue) color space or a YUV color space. YUV is a luma-chroma system that defines color via one luminance value and two chrominance values. The Y represented "luma," which is brightness, or lightness. U and V represent color information and are "color difference" signals of blue minus luma (B−Y) and red minus luma (R−Y), respectively. In one implementation, a depth aware camera can produce output data that can be converted into RGB-D (Red, Green, Blue-Depth) format or a YUV-D format. In one implementation, a depth aware camera can directly produce RGB-D output data or YUV-D output data. A RGB-D depth aware camera using a RGB color space is used as examples throughout this document. For example, a depth aware camera 105 can be a sensing system that can capture RGB images along with per-pixel depth information. The RGB images can include sequences of RGB images to compose a video. The individual RGB images in the sequences are hereinafter referred to as "frames". The depth aware camera 105 can capture one or more objects and/or portions of objects that are in range of the depth aware camera 140 to create content, for example, for a video stream for a video communication. The content can be a sequence of RGB images of the one or more objects. For example, a person (e.g., user 104) may be walking along a street, and there are buildings, street signs, signal lights, other people, trees, vehicles, etc. behind the person. The objects can include the user 104, the street, the buildings, etc. Portions of the user 104, street, buildings, etc. may be in a range 120 of the depth aware camera 105. The depth aware camera 105 can capture RGB images (e.g., RGB image 108) of a portion of the user 104, a portion of the building, a portion of the street, etc. to create the frames for the sequence of RGB images for a video stream for the video communication. For example, the depth aware camera 105 may capture RGB images of the head, the face, and shoulders of the user 104 and part of the buildings. The depth data from the depth aware camera 140 capturing images of the head, the face, and shoulders of the user 104 and part of the buildings can be used, for example, by the communication application 115 in the client device 110A-110Z, to identify one or more feature points of the object(s) and create a stabilized video stream for a video communication, as described in greater detail below in conjunction with FIGS. 3-8.

The depth aware camera 105 can create depth data for one or more objects (e.g., user 104, buildings, street, etc.) and/or portions of the object that are captured in range 120 of the camera 105. The depth data can be stored in a data store (e.g., data store 180). The data store 180 can be a persistent storage that is capable of storing data. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

Each of the frames in the sequence of RGB images in a video stream can have a foreground portion and a background portion, as defined by one or more objects in a respective frame. For example, one or more objects in a frame can be defined as foreground objects, and one or more objects in a frame can be defined as background objects. The foreground objects can define the foreground portion of a frame and the background objects can define the background portion of the frame. For example, a person (e.g., user 104) may be a foreground object that defines the foreground portion of a frame, and the buildings and street may be background objects that define the background portion of the frame. The communication application 115 can designate object(s) and/or portions of the object(s) as being either a foreground object or a background object based on configuration data that is stored in a data store (e.g., data store 180, data store 106). The configuration data may be predetermined and may specify, for example, that any object in a frame that has a facial feature is a foreground object, and any other object in the frame is a background object. Recognition of a user's face or facial features is performed only after receiving explicit authorization from the user.

Figure 2:
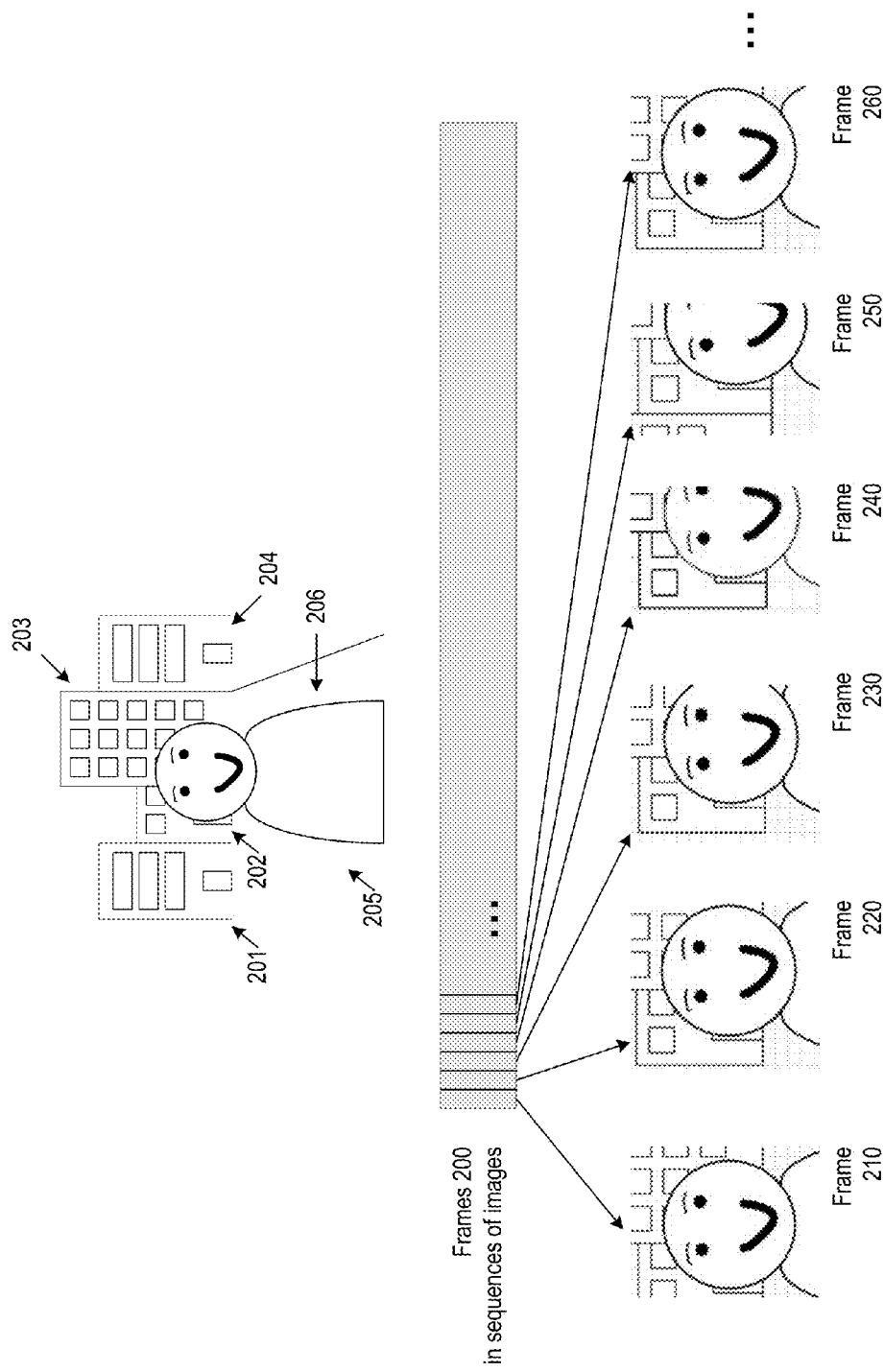
FIG. 2 depicts example frames in a sequence of images for a video communication using depth camera based data, in accordance with one implementation of the present disclosure.

FIG. 2 depicts example frames 200 in a sequence of images for a video communication using depth camera based data, in accordance with one implementation of the present disclosure. The frames (e.g., frames 210-260) can represent a user 205, a street 206, and buildings 201-204. The depth aware camera 105 may move or vibrate, and the frames 210-260 in the sequence of RGB images may capture different portions of objects as the range of the depth aware camera 105 moves with the depth aware camera 105. For example, frame 210, frame 220, and frame 260 in the sequence includes all of the user's 205 head and portions of two buildings 202,203. Frame 220 includes less of building 203 and more of building 202 compared to frame 210. Frame 230, frame 240 and frame 250 include part of the user's 205 head and different portions of the building 202,203 or different buildings. For example, Frame 240 includes the right eye of the user 205 and a portion of the left eye of the user 205, and frame 250 includes only the right eye of the user 205. Frame 250 also includes portions of three buildings (e.g., buildings 201,202,203).

When the frames are presented in sequence, the differences in the objects that are captured in the frames 210-260 can cause visible frame-to-frame jitter in the sequence of RGB images and cause a device to present unstable video. Referring to FIG. 1, the communication application 115 can use depth data from the depth aware camera 105 to (i) create one or more real-time models of one or more objects and/or portion(s) of the one or more objects for frames of a video stream, (ii) perform feature detection and feature analysis of the object(s) in the model(s) of the frames, and (iii) use the feature detection/analysis to stabilize the video stream.

The real-time models can be three-dimensional (3D) models. A real-time model can be a representation of the object and/or portions of the object as captured by the depth aware camera 105. For example, the communication application 115 can create a real-time model of the head, face, shoulders of the user 104, and the buildings and street behind the user 104. As will be discussed in more detail below, the communication application 115 can create a real-time model for object(s) in a particular frame based on the depth data that corresponds to the particular frame. The communication application 115 can create a model for a corresponding frame. The communication application 115 can create a model for more than one frame. For example, referring to FIG. 2, the communication application 115 may create a model of the user 205 and/or buildings for frame 210, a model of the user 205 and/or buildings for frame 220, a model of the user 205 and/or buildings for frame 230, a model of the user 205 and/or buildings for frame 240, a model of the user 205 and/or buildings for frame 250, and a model of the user 205 and/or buildings for frame 260.

Referring to FIG. 1, an object can have one or more features. A feature can pertain to a part of an object or the entire object itself. For example, the features of a person (e.g., user 104) can include and are not limited to facial features and body features. Recognition of a user's face or facial features is performed only after receiving explicit authorization from the user. In another example, the features of the buildings can include the walls, the windows, and the doors. The communication application 115 can detect one or more feature(s) of the object(s) in the real-time models and use the feature(s) to create a stabilized video stream of images (also referred to as "stabilized video stream"), as described in greater detail below in conjunction with FIGS. 3-8.

In one implementation, the stabilized video stream is rendered locally. For example, the user 104 may use a source device (e.g., client device 110A) to establish a communication session (e.g., a videoconference) including the stabilized video stream while visiting a social networking site or video content hosting site, with one or more other users via one or more target devices (e.g., client device 110Z).

The communication application 115 can render the stabilized video stream locally at the source device (e.g., client device 110A) and provide the stabilized video stream to one or more other communication applications 115 at target devices (e.g., client device 110Z) as part of the communication session. The stabilized video stream can replace one or more video streams that are part of the communication session. One or more target devices can present the stabilized video stream to the one or more recipient users. In one implementation, the communication application 115 transmits the stabilized video stream to an image stabilization component 140 on a server computing machine in a platform (e.g., mobile platform 150, collaboration platform 155, social network platform 160), and the image stabilization component 140 can transmit the rendered stabilized stream of images to the target client devices (e.g., client device 110Z).

In another implementation, the stabilized video stream is rendered remotely by an image stabilization component 140 at a server computing machine in a platform (e.g., mobile platform 150, collaboration platform 155, social network platform 160) and/or target client device (e.g., client device 110Z). For example, the communication application 115 in the source device (e.g., client device 110A) can use compression to send a pose representation of the stabilized video stream, in whole or in part, to an image stabilization component 140 on the server computing machine, and/or a target device (e.g., client device 110Z), which can then render the stabilized video stream remotely. The combination of position and orientation is referred to as the pose of an object. The pose representation can include data (e.g., positional data) that represents the locations of the features of the object.

One or more users can each use a client device 110A-110Z as a source device to create a stabilized video stream for a corresponding user. The communication application 115 on the one or more client devices 110A-110Z can share the stabilized video stream for the corresponding sender user with target devices as part of a communication session (e.g., videoconference) with recipient users.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Figure 3:
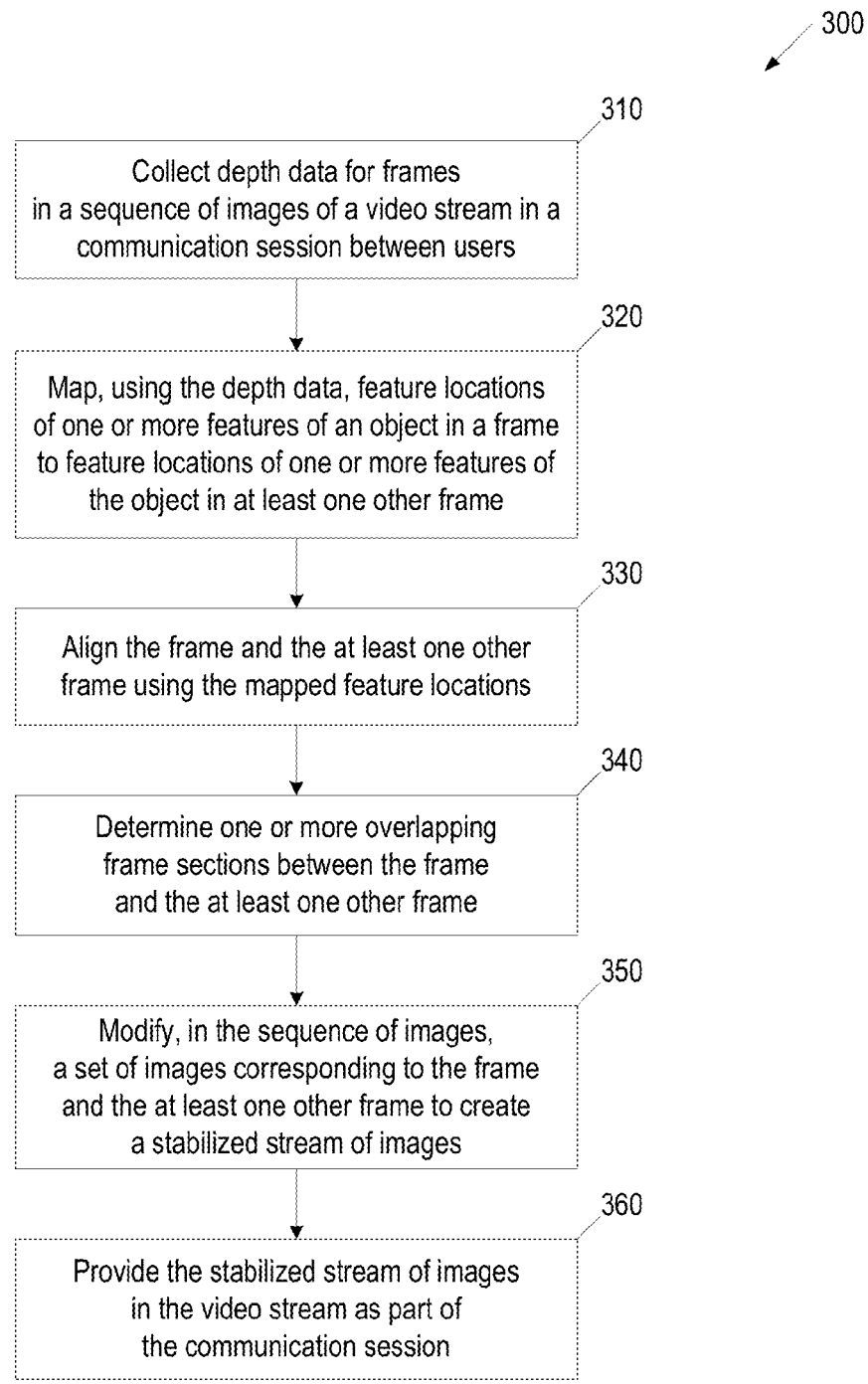
FIG. 3 depicts a flow diagram of aspects of a method for stabilizing images for a video communication using depth camera based data during a communication session, in accordance with one implementation of the present disclosure.

FIG. 3 depicts a flow diagram of aspects of a method 300 for stabilizing images for a video communication using depth camera based data during a communication session, in accordance with one implementation of the present disclosure. The method is performed by processing logic that may comprise hardware (circuitry, dedicated logic, etc.), software (such as is run on a general purpose computer system or a dedicated machine), or a combination of both. In one implementation, the method is performed by a communication application 115 in a client device 110A-110Z of FIG. 1, while in some other implementations one or more blocks of FIG. 3 may be performed by another machine. For example, in various alternative implementations, the at least a portion of the method can be performed by/at an image stabilization component 140 in a server computing machine of FIG. 1. In one implementation, a processing device of a client device 110A-110Z as shown in FIG. 1 performs method 300.

At block 310, the processing device collects depth data for frames in a sequence of images of a video stream as the video stream is being provided by a source device to a target device. The depth data refers to depth measurements of individual pixels in each frame. The video is part of a communication session between a user of the source device and user(s) of the target device(s). A depth aware camera of the source device captures frames and creates the depth data for the frames for the video. A video can include a video stream, which may be a visual and audio representation created from the depth aware camera electronically capturing, recording, processing, storing, transmitting, and reconstructing frames in a sequence of still RGB images representing scenes in motion. At each pixel in each frame in the sequence of images captured by the depth aware camera, there is a RGB measurement of the color and a depth (D) measurement. A depth aware camera can be used to determine how far an object (e.g., user) is from the camera using the depth measurements of the pixels associated with the object.

At block 320, the processing device uses the depth data to map feature locations of one or more features of an object in a frame to feature locations of one or more features of the object in at least one other frame. The object can be a person, such as a user of the source device or any other person that is being captured by depth aware camera of the source device. The features can be features of person, such as facial features. For example, the feature location of the beginning of the left eye of the user in a frame (e.g., frame 220 in FIG. 2) may be mapped to the feature location of the beginning of left eye in another frame (e.g., frame 210 in FIG. 2). In another example, the feature location of the end of the left eye in the frame may be mapped to the feature location of the end of left eye in the other frame. The frames can be consecutive frames in a sequence of images. One implementation of mapping the feature location of an object in a frame to feature locations of the object in another frame is described in greater detail below in conjunction with FIG. 8. The feature locations in one frame can be mapped to multiple frames. The number of frames having features being mapped can be predetermined and user-configurable. For example, the processing device may map feature locations in a frame to feature locations in two other frames. For example, referring to FIG. 2, the feature location of the beginning of the right side of the mouth of the user in frame 220 may be mapped to the feature location of the beginning of the right side of the mouth of the user in frame 210 and frame 230.

Figure 4:
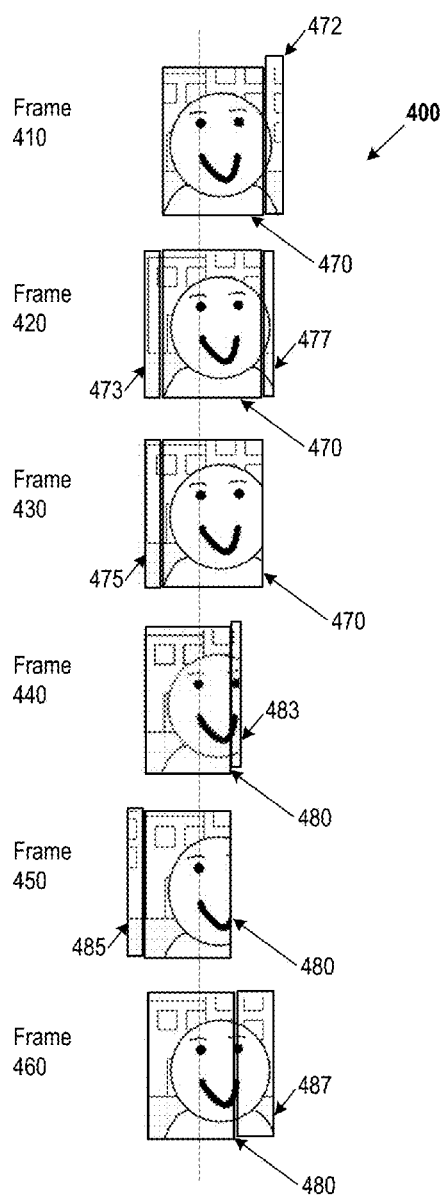
FIG. 4 depicts example frames in a sequence of images for a video communication using depth camera based data, in accordance with one implementation of the present disclosure.

Referring to FIG. 3, at block 330, the processing device aligns the frame and at least one other frame using the mapped feature locations. For example, the feature location of the beginning of the right eye of the user in the frame is aligned to the feature location of the beginning of right eye in at least one other frame. The depth measurements from the depth data can be used to create coordinates (e.g., X, Y and Z coordinates) for the features of an object. The processing device can use the coordinates of the features to align the frames. FIG. 4 depicts example frames 400 in a sequence of images for a video communication using depth camera based data, in accordance with one implementation of the present disclosure. The frames (e.g., frames 410-460) can represent a user, a street, and buildings. The number of frames being aligned can be predetermined and user-configurable. Multiple set of frames can be aligned. For example, for one set of frames, the processing device can align frame 420 with frame 410 and frame 430 using the feature location of the beginning of the right eye of the user in frame 420 with the feature location of the beginning of right eye in frame 410 and frame 430. In another example, for another set of frames, the processing device can align frame 450 with frame 440 and frame 460 using the feature location of the beginning of the right eye of the user in frame 450 with the feature location of the beginning of right eye in frame 440 and frame 460.

Referring to FIG. 3, at block 340, the processing device determines one or more overlapping frame sections between the frame and at least one other frame that is aligned to the frame. An overlapping frame section between frames refers to a frame section that is part of each of the frames and has a high degree of similarity across the frames. For example, the overlapping frame section can contain the same features, portion of features, objects, and/or portion of objects across the frames. For example, referring to FIG. 4, when comparing frame 420 with frame 410 and frame 430, frame 420, frame 410 and frame 430 contain an overlapping frame section 470. Overlapping frame section 470 contains the same portions of the user head, eyes, eyebrows, mouth, portions of shoulders, and portions of buildings. In another example, when comparing frame 450 with frame 440 and frame 460, frame 450, frame 440 and frame 460 contain an overlapping frame section 480. Overlapping frame section 480 contains the same portions of the user head, eyes, eyebrows, mouth, portions of shoulders, and portions of buildings. In one implementation, the processing device first determines which frame sections contain overlapping features of a user, such as facial features. Recognition of a user's face or facial features is performed only after receiving explicit authorization from the user.

Processing device can also determine frame sections that do not overlap between the aligned frames. A non-overlapping frame section between frames does not contain any features, portion of features, objects, and/or portion of objects that are the same in all of the frames being compared in a set. For example, when comparing frame 420 with frame 410 and frame 430, there are four non-overlapping frame sections. There is non-overlapping frame section 472 in frame 410, non-overlapping frame section 473 in frame 420, non-overlapping frame section 477 in frame 420, and non-overlapping frame section 475 in frame 423. In another example for another set of frames, when comparing frame 450 with frame 440 and frame 460, there are three non-overlapping frame sections. There is non-overlapping frame section 483 in frame 440, non-overlapping frame section 485 in frame 450 and non-overlapping frame section 487 in frame 460.

Figure 5:
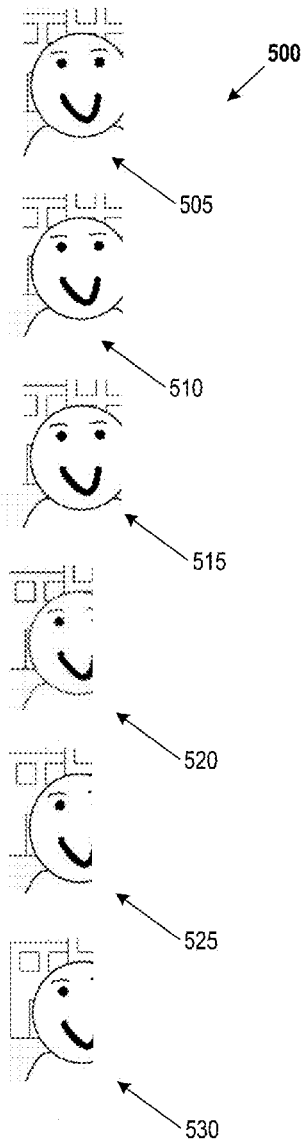
FIG. 5 depicts example frames in a sequence of images for a video communication using depth camera based data, in accordance with one implementation of the present disclosure.

Referring to FIG. 3, at block 350, the processing device modifies, in the sequence of images, a set of images corresponding to a set of frames to create a stabilized stream of images for the video stream. In one implementation, the processing device crops the overlapping frame sections from the original images for a set of frames to create new images to replace the corresponding set of frames. FIG. 5 depicts example new images 500 to create a stabilized sequence of images for a video communication using depth camera based data, in accordance with one implementation of the present disclosure. The processing device can crop the overlapping frame section 470 from frames 410-430 in FIG. 4 to create corresponding new images 505,510,515. The processing device can crop the overlapping frame section 480 from frames 440-460 in FIG. 4 to create corresponding new images 520,525,530. The new images 505,510,515 can replace frames 410-430 in a sequence of images for the video communication, and the new images 520,525,530 can replace frames 440-460 in the sequence of images for the video communication to remove the frame-to-frame jitter in the sequence of RGM images and cause a device to present a stabilized stream of images.

Figure 6:
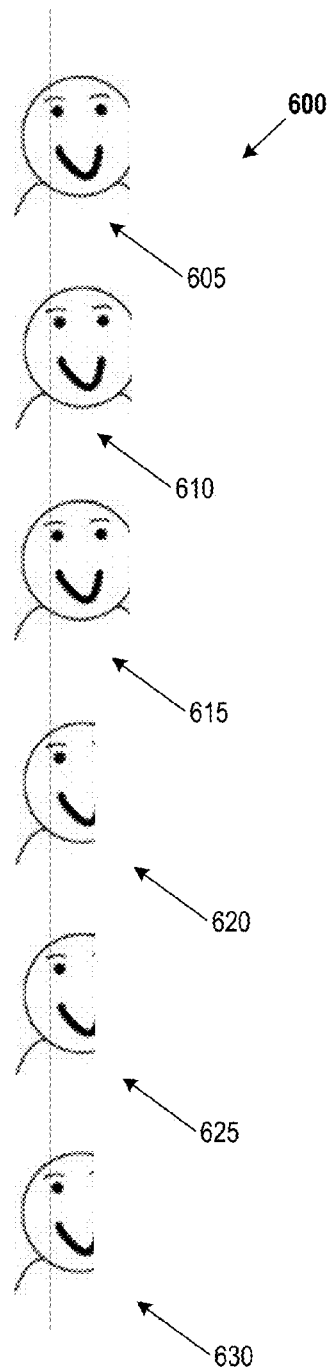
FIG. 6 depicts example frames in a sequence of images for a video communication using depth camera based data, in accordance with one implementation of the present disclosure.

In one implementation, the new images that replace the corresponding frames contain only foreground objects. For example, the processing device can label a person (e.g., the user of the source device) in the frames as a foreground object and can label one or more objects in the frames, other than the person of the source device, as background objects. The processing device then removes from the original images one or more sections of the frames that contain the background objects to create new images. FIG. 6 depicts example new images 600 to create a stabilized sequence of images for a video communication using depth camera based data, in accordance with one implementation of the present disclosure. The new images 600 do not contain any background objects (e.g., buildings, street). The processing device can remove background objects (e.g., buildings, street) from the original images for set of frames (e.g., set of frames 410-430 and set of frames 440-460 in FIG. 4) and crop the overlapping frame section (e.g., section 470 in FIG. 4) in the original images from the sets of frames to create corresponding new images 605,610,615, 620,625,630 that only contain a foreground object (e.g., user) to replace the frames (e.g., frames 410-460 in FIG. 4) for a stabilized video stream.

Figure 7:
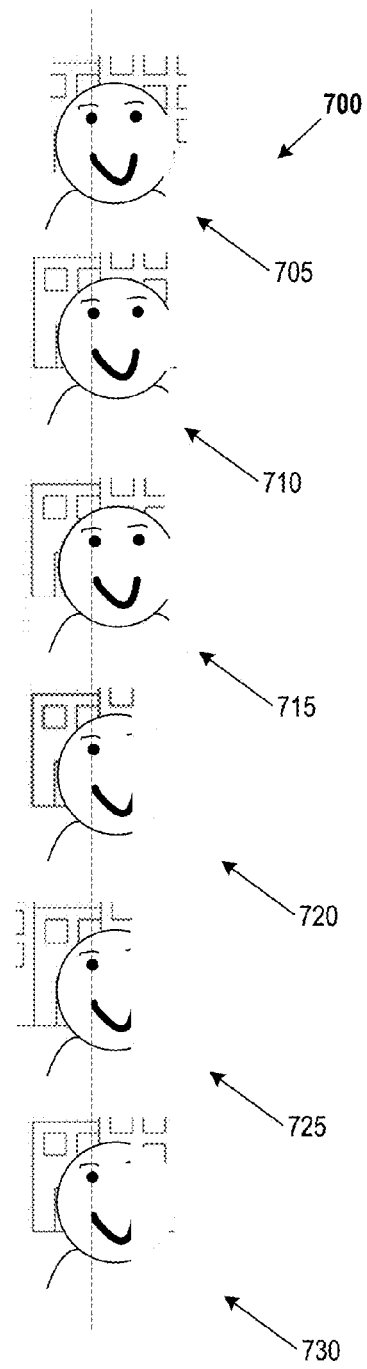
FIG. 7 depicts example frames in a sequence of images for a video communication using depth camera based data, in accordance with one implementation of the present disclosure.

In another implementation, the new images contain the same overlapping frame section (e.g., overlapping frame section 470 in FIG. 4) of a foreground object (e.g., person) and retain the original background objects in the background frame sections included in the respective original images. FIG. 7 depicts example new images 700 to create a stabilized sequence of images for a video communication using depth camera based data, in accordance with one implementation of the present disclosure. The new images 700 contain the background objects (e.g., buildings, street) from the original images for the corresponding frames (e.g., frames 410-460 in FIG. 4). The processing device can retain the background objects (e.g., buildings) from the original images for frames and replace the original section in the image that contains the user with an overlapping frame section (e.g., section 470 or section 480 in FIG. 4) of the user to create corresponding new images 705,710,715,720,725, 730 to replace the frames (e.g., frames 410-460 in FIG. 4) for a stabilized video stream. In one implementation, the processing device creates a copy of the original images for the frames (e.g., frames 410-460 in FIG. 4) and replaces sections of the images that contain a foreground object (e.g., user) with an overlapping frame section that contains the foreground image to create the stabilized stream of images.

At block 360, the processing device provides the stabilized stream of images in the video stream as part of the communication session. The created stabilized images can be rendered at a client device or at a server. The rendered stabilized images are provided in a video stream in real-time. The rendered stabilized images can replace at least a portion of a video stream that is intended for another user (e.g., another participant user in a video conference). The rendered stabilized images can also replace at least a portion of a video stream that is intended for the user of a target device.

In one implementation, block 360 is performed by the communication application in a client device. For example, the communication application can replace at least a portion of a video stream with the rendered stabilized images. In another implementation, the communication application sends the rendered stabilized images to an image stabilization component in a server computing machine, and the image stabilization component can replace at least a portion of a video stream with the rendered stabilized images.

As described herein, multiple content streams (e.g., video streams) can be received by an image stabilization component at a server computing machine from various client devices 110A-110Z, and the image stabilization component can replace the video streams with the rendered stabilized video stream for the corresponding participant. The image stabilization component can then generate a composite content/media stream, which includes stabilized video stream and provide the composite content/media stream to the various participants in a communication session (e.g., a videoconference). Such a composite content/media stream can arrange the various content streams in different presented regions, such that a user/participant in the videoconference can simultaneously view some or all of the content streams within a single interface/screen.

Figure 8:
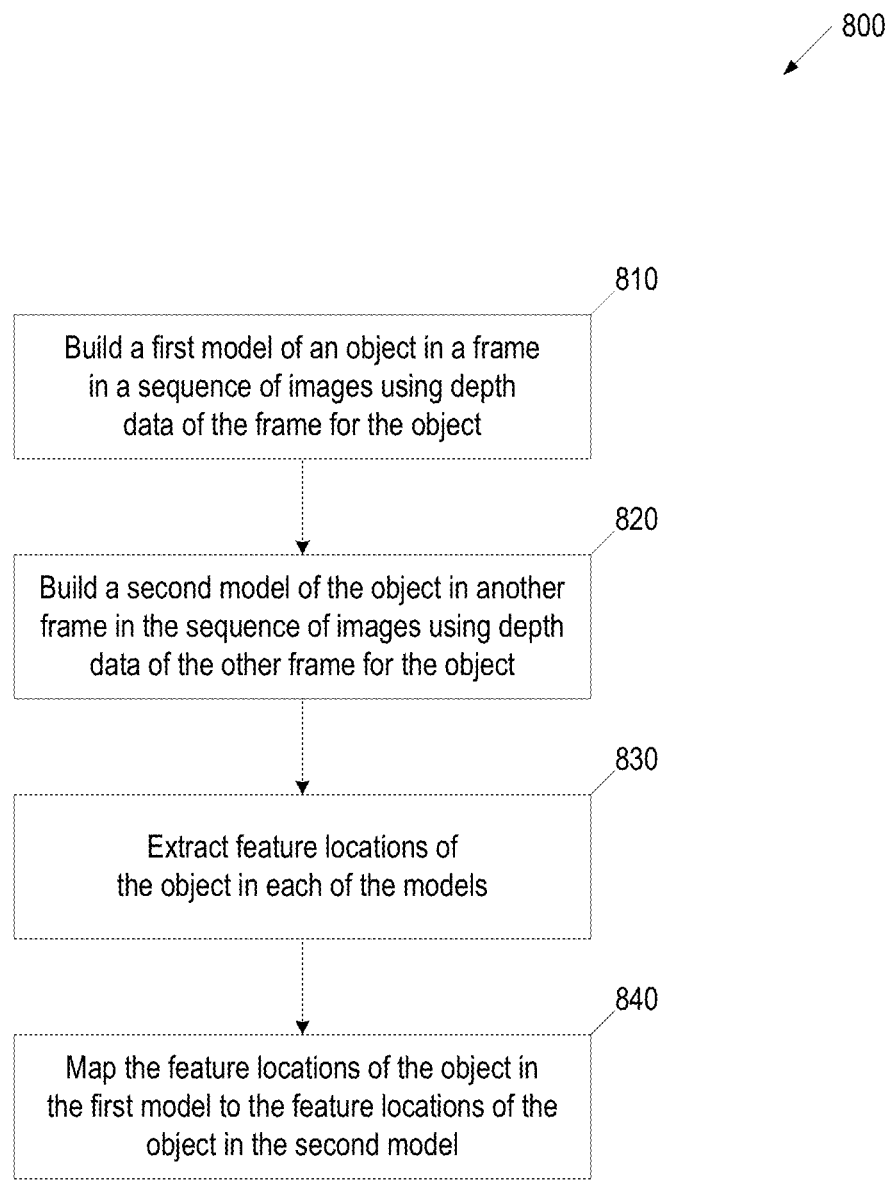
FIG. 8 depicts a flow diagram of aspects of a method for mapping features of an object in a set of frames of a video using depth camera based data during a communication session, in accordance with one implementation of the present disclosure.

FIG. 8 depicts a flow diagram of aspects of a method 800 for mapping feature locations of an object on a frame to feature locations of the object in another frame based on data from a depth aware camera, in accordance with one implementation of the present disclosure. The method is performed by processing logic that may comprise hardware (circuitry, dedicated logic, etc.), software (such as is run on a general purpose computer system or a dedicated machine), or a combination of both. In one implementation, the method is performed by a communication application 115 in a client device 110A-110Z of FIG. 1, while in some other implementations one or more blocks of FIG. 8 may be performed by another machine. For example, in various alternative implementations, the at least a portion of the method can be performed by/at an image stabilization component 140 in a server computing machine of FIG. 1. In one implementation, a processing device of a client device 110A-110Z as shown in FIG. 1 performs method 800.

At block 810, the processing device builds a real-time model of an object in a frame in a sequence of images using the depth data (e.g., depth measurements for individual pixels) of the frame for the object. The object can include one or more parts (e.g., head, face, shoulders, etc.) of a person (e.g., user of a source device) that is captured by a depth aware camera that is providing a video of the person to a user of a target device.

In one implementation, a dense three dimensional (3D) point cloud is built based on the depth per pixel data. A point cloud is a set of data points in a coordinate system. In a three-dimensional coordinate system, these points are defined by X, Y, and Z coordinates. The depth measurements from the depth aware camera can represent the points on the surface of an object (e.g., person's head, face, and shoulders), and can be used to output a point cloud as a data file. In one implementation, the 3D point cloud is converted into a 3D mesh. A mesh can include vertices that are connected by edges and faces, to give the visual appearance of form to a 3D object or 3D environment. In one implementation, the 3D mesh is a texture mapped with the RGB image corresponding to the frame to create a real-time 3D model of the object (e.g., person's head, face, and shoulders). The real-time 3D model of the object can be created in real-time, for example, during a communication session (e.g., video chat).

The processing device can build a real-time model of multiple objects in the frame using the depth data of the frame for the objects. The multiple objects can include all of the objects in the frame. For example, the multiple objects can include a person's head, face, and shoulders, buildings, a street, street signs, vehicles, trees, etc.

At block 820, the processing device builds a second real-time model of the object in another frame in the sequence of images using the depth data of the other frame for the object. In one implementation, a 3D point cloud is built based on the depth per pixel data from the other frame and converted into a 3D mesh. The 3D mesh is texture mapped with the RGB image corresponding to the other frame to create a real-time 3D model of the object (e.g., person's head, face, and shoulders). The real-time 3D model of the object in the other frame can be created in real-time, for example, during a communication session (e.g., video chat).

At block 830, the processing device extracts the feature locations of one or more features of the object in the first real-time model and the second real-time model to determine where the features (e.g., facial features, body features) of the object are located in each model. For example, the facial features (e.g., eyes, nose, mouth, lips, eyebrows, forehead, etc.) of the person's face are located. In another example, the body features (e.g., ears, shoulders, neck, etc.) of the user are also located. Recognition of a user's face or facial features is performed only after receiving explicit authorization from the user. In one implementation, a scale-invariant feature transform (SIFT) algorithm is used to detect and describe the feature locations.

At block 840, the processing device maps the feature locations of the object in the first real-time model for the frame to the feature locations of the object in the second real-time model for the other frame. A transformation function (transform) that represents the mapping of the feature locations can be created. For example, the feature location of the beginning of the left eye in the first real-time model is mapped to the feature location of the beginning of left eye in the second real-time model, the feature location of the end of the left eye in the first real-time model is mapped to the feature location of the end of left eye in the second real-time model, etc. The mapping can include for example, and is not limited to, left side of left eyebrow, right side of left eyebrow, left side of right eyebrow, right side of right eyebrow, corners of a mouth, beginning/end of upper lip, beginning/end of lower lip, chin, etc.

Figure 9:
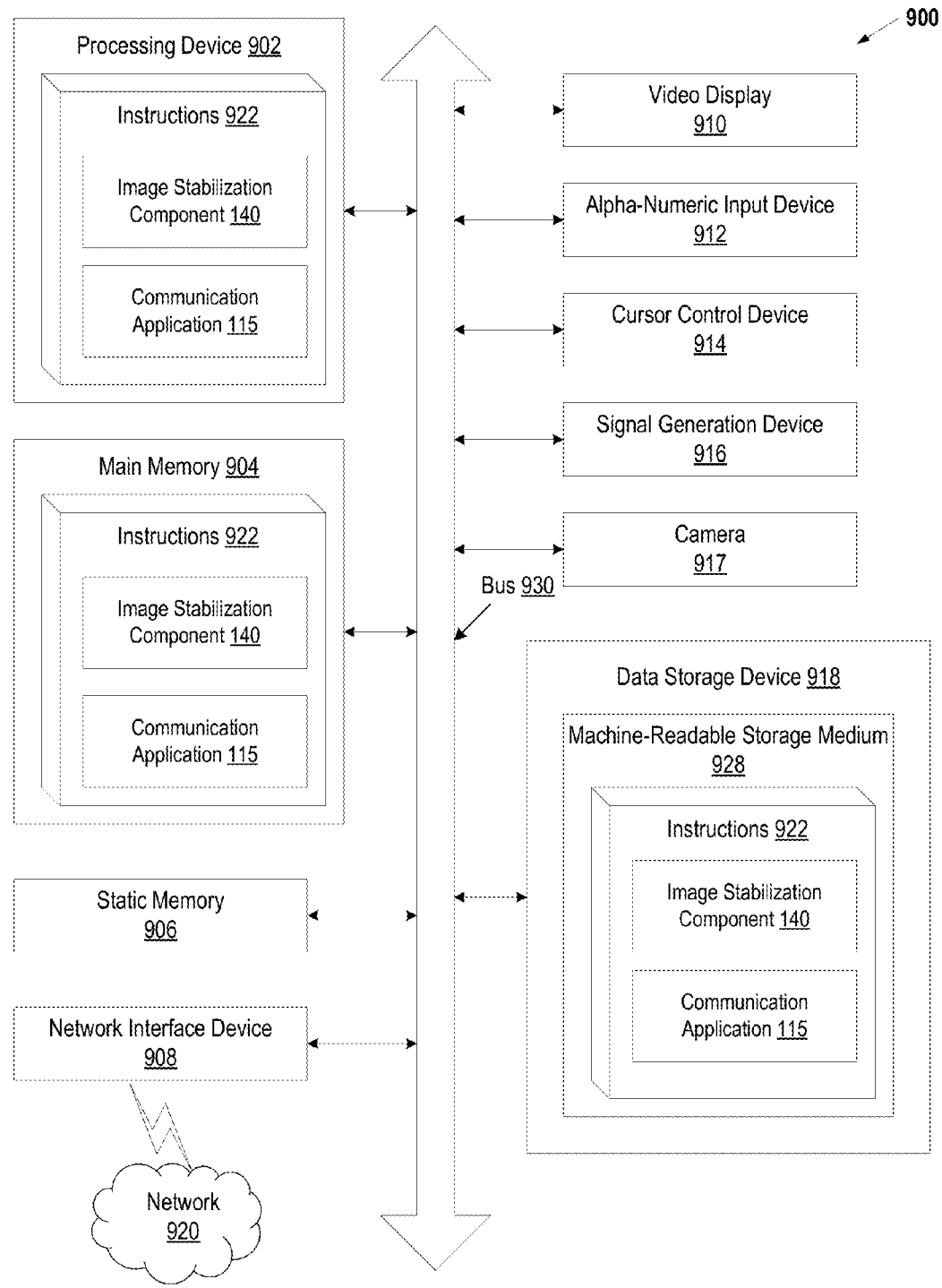
FIG. 9 depicts a block diagram of an example computing device operating in accordance with one or more aspects of the present disclosure.

FIG. 9 illustrates a diagram of a machine in an example form of a computer system 900 within which a set of instructions, for causing the machine to perform any one or more of the methodologies discussed herein, can be executed, in accordance with one implementation of the present disclosure. The computer system 900 can be client device 110A-110Z in FIG. 1. The computer system 900 can be server computing machine in a platform (e.g., mobile platform 150, collaboration platform 155, social network platform 160) in FIG. 1. In alternative implementations, the machine can be connected (e.g., networked) to other machines in a LAN, an intranet, an extranet, or the Internet. The machine can operate in the capacity of a server or a client machine in client-server network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processing device (processor) 902, a main memory 904 (e.g., read-only memory (ROM), flash memory, dynamic random access memory (DRAM) such as synchronous DRAM (SDRAM), double data rate (DDR SDRAM), or DRAM (RDRAM), etc.), a static memory 906 (e.g., flash memory, static random access memory (SRAM), etc.), and a data storage device 918, which communicate with each other via a bus 930.

Processor (processing device) 902 represents one or more general-purpose processing devices such as a microprocessor, central processing unit, or the like. More particularly, the processor 902 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 can also be one or more special-purpose processing devices such as an application specific integrated circuit (ASIC), a field programmable gate array (FPGA), a digital signal processor (DSP), network processor, or the like. The processor 902 is configured to execute instructions 922 for performing the operations and steps discussed herein.

The computer system 900 can further include a network interface device 908. The computer system 900 also can include a video display unit 910 (e.g., a liquid crystal display (LCD) or a cathode ray tube (CRT)), an input device 912 (e.g., a keyboard, and alphanumeric keyboard, a motion sensing input device, touch screen), a cursor control device 914 (e.g., a mouse), and a signal generation device 916 (e.g., a speaker). The computer system 900 also can include a camera 917 to record images that can be stored directly, transmitted to another location, or both. These images can be still photographs or moving images such as videos or movies. The camera 917 can be a depth aware camera that can capture RGB images along with per-pixel depth information.

The data storage device 918 can include a non-transitory computer-readable storage medium 928 on which is stored one or more sets of instructions 922 (e.g., software) embodying any one or more of the methodologies or functions described herein. The instructions 922 can also reside, completely or at least partially, within the main memory 904 and/or within the processor 902 during execution thereof by the computer system 900, the main memory 904 and the processor 902 also constituting computer-readable storage media. The instructions 922 can further be transmitted or received over a network 920 via the network interface device 908.

In one implementation, the instructions 922 include instructions for a communication application (e.g., communication application 115 in FIG. 1) and/or a software library containing methods that call the communication application. In one implementation, the instructions 922 include instructions for an image stabilization component (e.g., image stabilization component 140 in FIG. 1) and/or a software library containing methods that call the media processing engine. While the computer-readable storage medium 928 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "collecting", "mapping", "determining", "modifying", "providing", "identifying", "removing", "aligning", "cropping", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In situations in which the methods and systems discussed here collect personal information about users, or make use of personal information, the users are provided with opportunities to control whether programs or features collect user information (e.g., a user's biometric information, face recognition or visual information on a user's face or facial components, information about a user's social network, social actions or activities, profession, a user's preferences, or a user's current location), and to control whether and how to receive content from the content server that may be more relevant to the user. In addition, certain data is treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Any user biometric information is collected, recorded, analyzed or used only after the user explicitly authorizes such collection, recording, analysis or use. Thus, the user may have control over how information is collected about the user and used by a content server.

What is claimed is:

1. A method comprising:
    collecting, by a processing device, depth measurements for pixels of frames in a sequence of images of a video stream being provided by a source device to a target device as part of a communication session between a user of the source device and a user of the target device, the depth measurements being created by a depth aware camera of the source device;
    mapping, using the depth measurements for the pixels of the frames, feature locations of one or more features of an object in a frame in the sequence of images to feature locations of the one or more features of the object in at least one other frame in the sequence of images;
    determining one or more overlapping frame sections between the frame and the at least one other frame using the mapped feature locations;
    modifying, in the sequence of images, a set of images corresponding to the frame and the at least another frame based on the overlapping frame sections to create a stabilized stream of images for the video stream; and
    providing the stabilized stream of images in the video stream as part of the communication session,
    wherein the overlapping sections comprise at least a portion of a person, and modifying the set of images to create the stabilized stream of images comprises:
    creating a copy of the frame and the at least one other frame;
    replacing a section of the copy of the frame that contains the portion of the person with the overlapping frame section without modifying a background portion of the copy of the frame; and
    replacing a section of the copy of the at least one other frame that contains the portion of the person with the overlapping frame section without modifying a background portion of the copy of the at least one other frame.

2. The method of claim 1, wherein the object comprises at least a portion of a face or a facial feature.

3. The method of claim 1, wherein modifying the set of images comprises:
    identifying the person in the images as a foreground object;
    identifying one or more objects in the set of images, other than the person, as background objects; and
    removing one or more sections of the frames that correspond to the set of images containing the background objects.

4. The method of claim 1, wherein determining the one or more overlapping frame sections comprises:
    aligning the frame and the at least one other frame using the mapped feature locations; and
    identifying, as the overlapping frame sections, one or more sections in a foreground portion of the frame and one or more sections in a foreground portion of the at least one other frame comprising at least one of same objects or same portions of objects.

5. The method of claim 1, wherein the communication session is a video chat via a mobile device.

6. A system comprising:
    a memory; and
    a processing device, coupled to the memory, to:
    collect depth measurements for pixels of frames in a sequence of images of a video stream being provided by a source device to a target device as part of a communication session between a user of the source device and a user of the target device, the depth measurements being created by a depth aware camera of the source device;
    map, using the depth measurements for the pixels of the frames, feature locations of one or more features of an object in a frame in the sequence of images to feature locations of the one or more features of the object in at least one other frame in the sequence of images;
    determine one or more overlapping frame sections between the frame and the at least one other frame using the mapped feature locations;
    modify, in the sequence of images, a set of images corresponding to the frame and the at least another frame based on the overlapping frame sections to create a stabilized stream of images for the video stream; and
    provide the stabilized stream of images in the video stream as part of the communication session,
    wherein the overlapping sections comprise at least a portion of a person, and to modify the set of images to create the stabilized stream of images, the processing device is to:
    create a copy of the frame and the at least one other frame;
    replace a section of the copy of the frame that contains the portion of the person with the overlapping frame section without modifying a background portion of the copy of the frame; and
    replace a section of the copy of the at least one other frame that contains the portion of the person with the overlapping frame section without modifying a background portion of the copy of the at least one other frame.

7. The system of claim 6, wherein the object comprises at least a portion of a face or a facial feature.

8. The system of claim 6, wherein to modify the set of images, the processing device is to:
    identify the person in the images as a foreground object;
    identify one or more objects in the set of images, other than the person, as background objects; and
    remove one or more sections of the frames that correspond to the set of images containing the background objects.

9. The system of claim 6, wherein to determine the one or more overlapping frame sections, the processing device is to:
    align the frame and the at least one other frame using the mapped feature locations; and
    identify, as the overlapping frame sections, one or more sections in a foreground portion of the frame and one or more sections in a foreground portion of the at least one other frame comprising at least one of same objects or same portions of objects.

10. The system of claim 6, wherein the communication session is a video chat via a mobile device.

11. A non-transitory computer readable medium having instructions stored thereon that, when executed by a processing device, cause the processing device to perform operations comprising:
- collecting, by the processing device, depth measurements for pixels of frames in a sequence of images of a video stream being provided by a source device to a target device as part of a communication session between a user of the source device and a user of the target device, the depth measurements being created by a depth aware camera of the source device;
- mapping, using the depth measurements for the pixels of the frames, feature locations of one or more features of an object in a frame in the sequence of images to feature locations of the one or more features of the object in at least one other frame in the sequence of images;
- determining one or more overlapping frame sections between the frame and the at least one other frame using the mapped feature locations;
- modifying, in the sequence of images, a set of images corresponding to the frame and the at least another frame based on the overlapping frame sections to create a stabilized stream of images for the video stream; and
- providing the stabilized stream of images in the video stream as part of the communication session,
- wherein the overlapping sections comprise at least a portion of a person, and modifying the set of images to create the stabilized stream of images comprises:
- creating a copy of the frame and the at least one other frame;
- replacing a section of the copy of the frame that contains the portion of the person with the overlapping frame section without modifying a background portion of the copy of the frame; and
- replacing a section of the copy of the at least one other frame that contains the portion of the person with the overlapping frame section without modifying a background portion of the copy of the at least one other frame.

12. The non-transitory computer readable medium of claim 11, wherein the object comprises at least a portion of a face or a facial feature.

13. The non-transitory computer readable medium of claim 11, wherein modifying the set of images comprises:
- identifying the person in the images as a foreground object;
- identifying one or more objects in the set of images, other than the person, as background objects; and
- removing one or more sections of the frames that correspond to the set of images containing the background objects.

14. The non-transitory computer readable medium of claim 11, wherein determining the one or more overlapping frame sections comprises:
- aligning the frame and the at least one other frame using the mapped feature locations; and
- identifying, as the overlapping frame sections, one or more sections in a foreground portion of the frame and one or more sections in a foreground portion of the at least one other frame comprising at least one of same objects or same portions of objects.

* * * * *